(12) United States Patent
Neag et al.

(10) Patent No.: US 6,722,226 B2
(45) Date of Patent: Apr. 20, 2004

(54) ADJUSTABLE PEDAL ASSEMBLY

(75) Inventors: Dorinel Neag, Walled Lake, MI (US); Daniel W Husted, Saline, MI (US); James P Salva, Shelby Township, MI (US); Stylianos A Meidanis, West Bloomfield, MI (US); Thomas R Carbone, Grosse Pointe Park, MI (US); Victor Johnson, Royal Oak, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 206 days.

(21) Appl. No.: 09/963,083

(22) Filed: Sep. 24, 2001

(65) Prior Publication Data

US 2003/0057693 A1 Mar. 27, 2003

(51) Int. Cl.7 .................................................. G05G 1/14
(52) U.S. Cl. ..................... 74/512; 74/513; 74/515 R; 74/560; 74/561; 74/562
(58) Field of Search ........................... 74/512, 513, 542, 74/560, 561, 562, 515 R; 280/753, 748

(56) References Cited

U.S. PATENT DOCUMENTS

| | | | | |
|---|---|---|---|---|
| 3,151,499 A | * | 10/1964 | Roe | 74/560 |
| 3,643,525 A | * | 2/1972 | Gibas | 74/512 |
| 5,172,606 A | * | 12/1992 | Dzioba et al. | 74/512 |
| 5,855,143 A | | 1/1999 | Ewing | 74/512 |
| 5,927,154 A | | 7/1999 | Elton et al. | 74/512 |
| 6,019,015 A | | 2/2000 | Elton | 74/513 |
| 6,073,515 A | * | 6/2000 | Elton et al. | 74/564 |
| 6,189,409 B1 | * | 2/2001 | Neag et al. | 74/512 |
| 6,520,045 B2 | * | 2/2003 | Fukase et al. | 74/512 |
| 2002/0038577 A1 | * | 4/2002 | Bialk et al. | 74/512 |
| 2002/0088303 A1 | * | 7/2002 | Hayashihara et al. | 74/560 |

FOREIGN PATENT DOCUMENTS

| EP | 000936527 A2 | * | 8/1999 | ................. 74/512 |
|---|---|---|---|---|

* cited by examiner

Primary Examiner—Vinh T. Luong
(74) Attorney, Agent, or Firm—Edwin W. Bacon, Jr.

(57) ABSTRACT

A locationally adjustable actuator is provided having a force input to a rod operatively associated with an automotive vehicle control. The actuator includes two parallelogram linkages which link an actuator pedal to a rod link which is pivotally connected with a rod which provides an automotive vehicle control input. The parallelogram arrangement is furthermore connected with a slider which is linearly adjustable with respect to the vehicle. Movement of the slider causes the actuator pedal to be linearly adjusted.

16 Claims, 4 Drawing Sheets

US 6,722,226 B2

ADJUSTABLE PEDAL ASSEMBLY

FIELD OF THE INVENTION

The field of the invention is that of a locationally adjustable actuator to provide input to an automotive vehicle control. More particularly, the invention relates to a powered locationally adjustable brake or clutch and accelerator pedal assembly which can provide linear locational adjustment while at the same time providing independent inputs for the various operational functions and which can also provide a constant push rod/pedal force ratio.

BACKGROUND OF THE INVENTION

It is known in the art that certain vehicles provide pedal assemblies that are locationally adjustable. Adjustable pedal assemblies are advantageous in that they allow for greater operator comfort. Adjustable pedal assemblies also help compensate for a lack of seat adjustment fore and aft in a vehicle. It is desirable for an adjustable pedal assembly to provide as linear an adjustment as possible. Many adjustable pedal assemblies of the past provided adjustment along an arc. It is also desirable to provide an adjustable pedal assembly wherein the ratio of push rod force respective pedal force ratio remains constant during the various stages of operation.

SUMMARY OF THE INVENTION

To provide a linearly adjustable pedal with a constant push rod/pedal force ratio combined with additional advantages unavailable in the revealed art, a revelation of the present invention is brought forth.

In a preferred embodiment, the present invention provides a locationally adjustable actuator for providing a force input to a rod operatively with a vehicle control. An actuator includes a rod link having a first pivotal connection with respect to the vehicle and a second pivotal connection with the control rod. An upper front link is provided having a first pivotal connection with the vehicle coaxial with the rod's first pivotal connection. A lower front link is provided having a third pivotal connection with the rod link. A middle link is provided having a first end with a fourth pivotal connection with the upper front link. The middle link has a fifth pivotal connection with the lower front link. An upper rear link is provided having a fourth pivotal connection with the upper front link and the middle link. A lower rear link is provided having a fifth pivotal connection with the lower front link and the middle link. A pedal link is provided having a sixth pivotal connection with the upper rear link and a seventh pivotal connection with the lower rear link. A slider is slidably mounted on a frame and has a sixth pivotal connection with the pedal link and with the upper rear link. Linear adjustment of the slider with respect to the vehicle linearally adjusts the position of the pedal link with respect to the vehicle. Additionally, a knee bolster can be provided which is pivotally connected in an area adjacent the vehicle dashboard and has a lower end pivotally connected by a link to the slider. Accordingly, adjustment of the slider and of the pedal actuator also adjusts the position of the knee bolster to place it in a more optimum position for vehicle occupants regardless of their height.

It is a feature of the present invention to provide an adjustable foot pedal. It is also a feature of the present invention to provide an adjustable foot pedal which additionally provides an adjustable knee bolster.

Other features of the invention will become more apparent to those skilled in the art upon a reading of the following detailed description and upon reference to the drawings.

DETAILED DESCRIPTION OF THE PREFERRED EMBODIMENT

Figure 1:
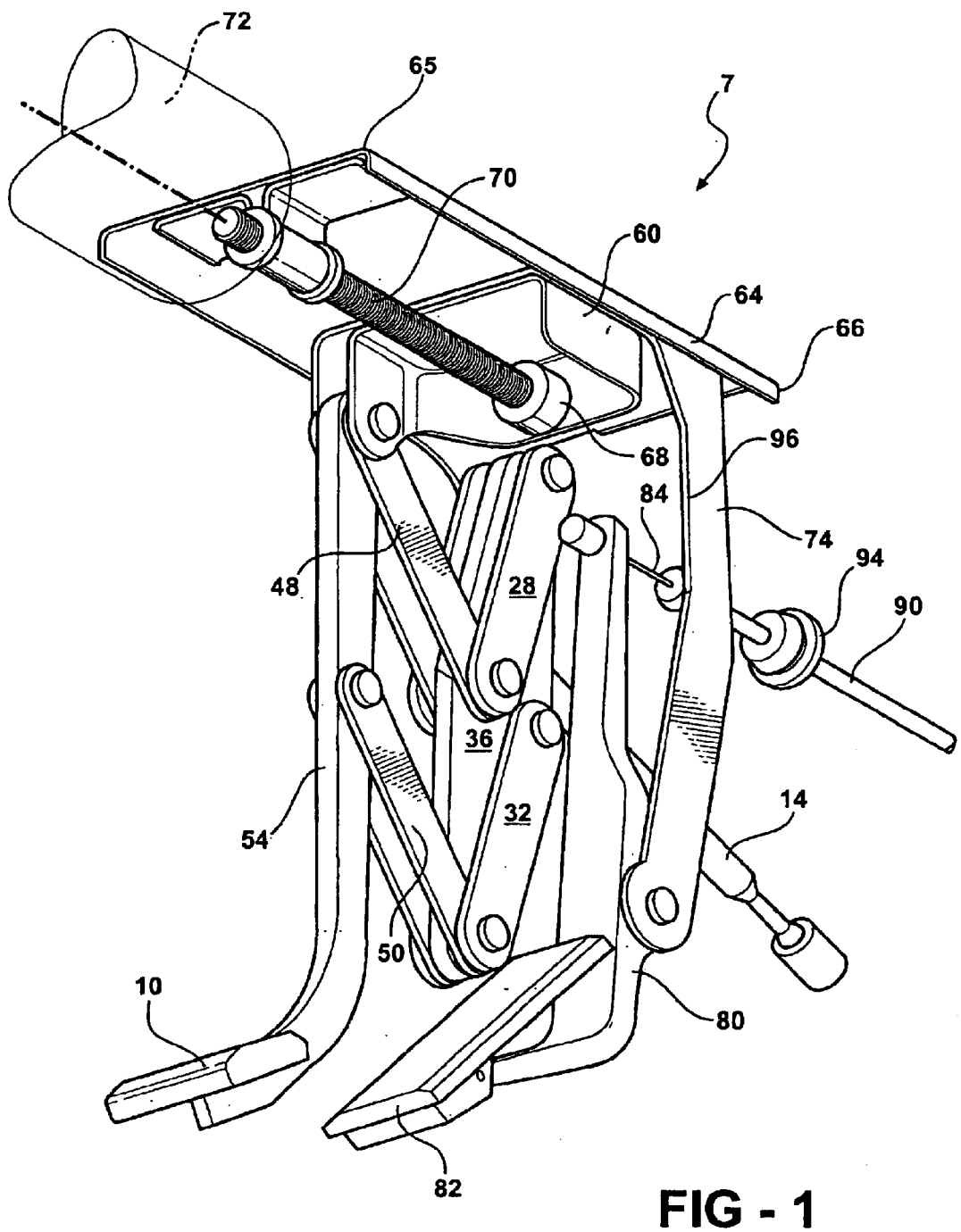
FIG. 1 is a perspective view of a preferred embodiment actuator according to the present invention providing a linearly adjustable brake or clutch pedal and accelerator pedal assembly.

Referring to FIGS. 1–5, a locationally adjustable actuator 7 provides a force input to a rod operatively associated with an automotive vehicle control. The actuator 7 allows a foot pedal 10 to provide a force input to a rod 14. Rod 14 is operatively associated with an automotive vehicle control such as a brake or a transmission clutch.

The actuator 7 has a rod link 18. The rod link 18 has a first pivotal connection 20 with respect to the vehicle. The rod link 18 has a second pivotal connection 22 with respect to the rod 14.

Figure 2:
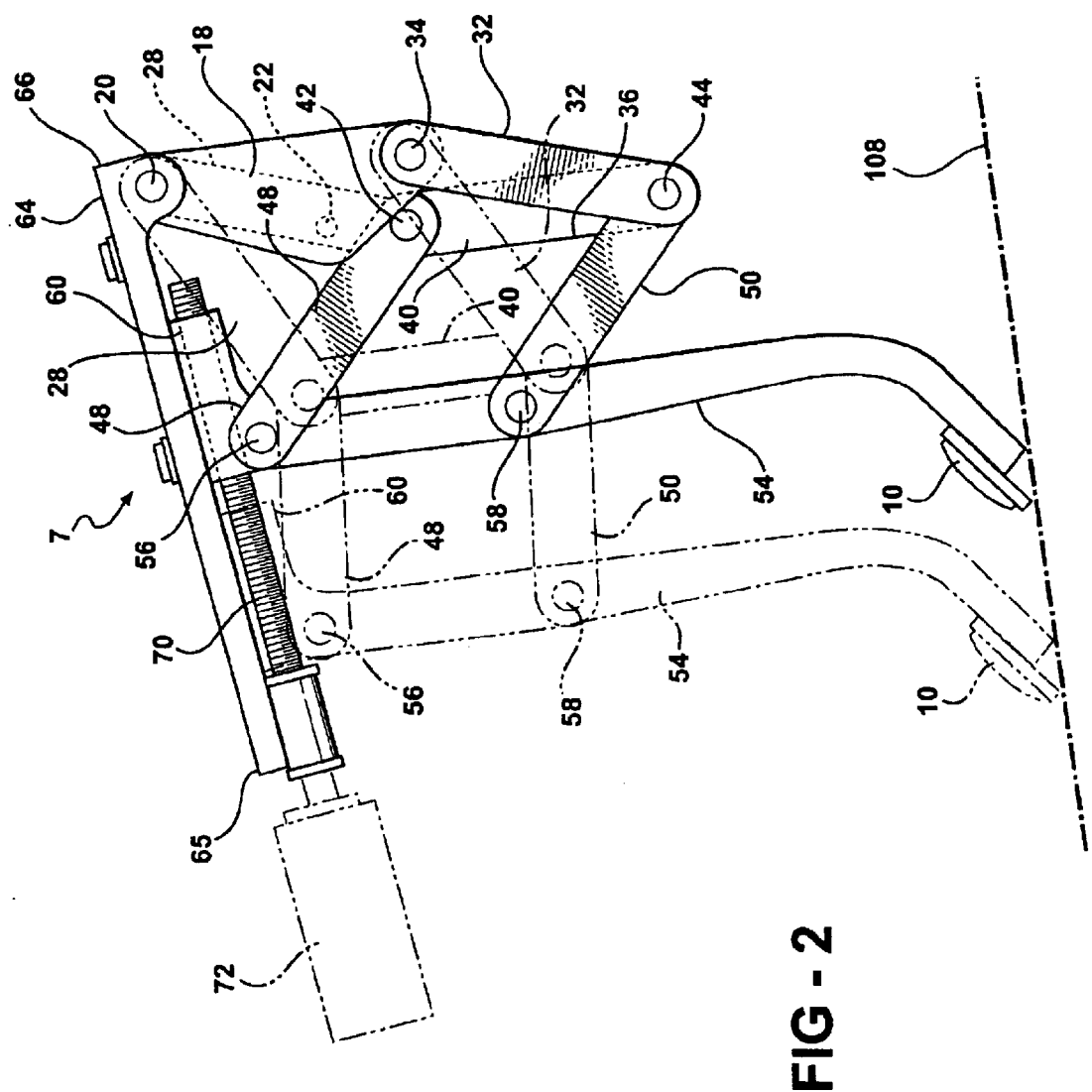
FIG. 2 is a side elevational operational view illustrating the linkages of the brake pedal or clutch pedal of the present invention in its extreme adjusted positions.

The actuator 7 has an upper front link 28. The upper front link has a pivotal connection with respect to the vehicle generally adjacent to the first pivotal connection 20 and in the embodiment shown in FIG. 2 is coaxial therewith.

The actuator 7 also has a lower front link 32. The lower front link 32 has a third pivotal connection 34 with respect to the rod link 18.

The actuator 7 has a middle link 36. The middle link 36 has a pivotal connection 42 with respect to the upper front link 28. The middle link 36 also has a fifth pivotal connection 44 with respect to the lower front link 32.

The actuator 7 has an upper rear link 48. The upper rear link 48 has a pivotal connection with respect to the middle link 36 which is generally adjacent to the pivotal connection of the upper front link 28 with respect to the middle link 36. As shown in FIGS. 1 and 2, the upper rear link 48 has a fourth pivotal connection 42 with the middle link 36.

The actuator 7 has a lower rear link 50 which has a pivotal connection with respect to the middle link 36 which is generally adjacent to the pivotal connection of the lower front link 32 with respect to the middle link 36. As shown, the lower rear link 50 has a fifth pivotal connection with the middle link 36.

The actuator 7 additionally has a pedal link 54. The pedal link has a sixth pivotal connection 56 with respect to the upper rear link 48. The pedal link 54 has a seventh pivotal connection 58 with respect to the lower rear link 50. The term pedal link as used herein refers not only to links which are actuated by foot but can also refer to embodiments (not shown) wherein the actuator may be manipulated by hand motion.

Figure 3:
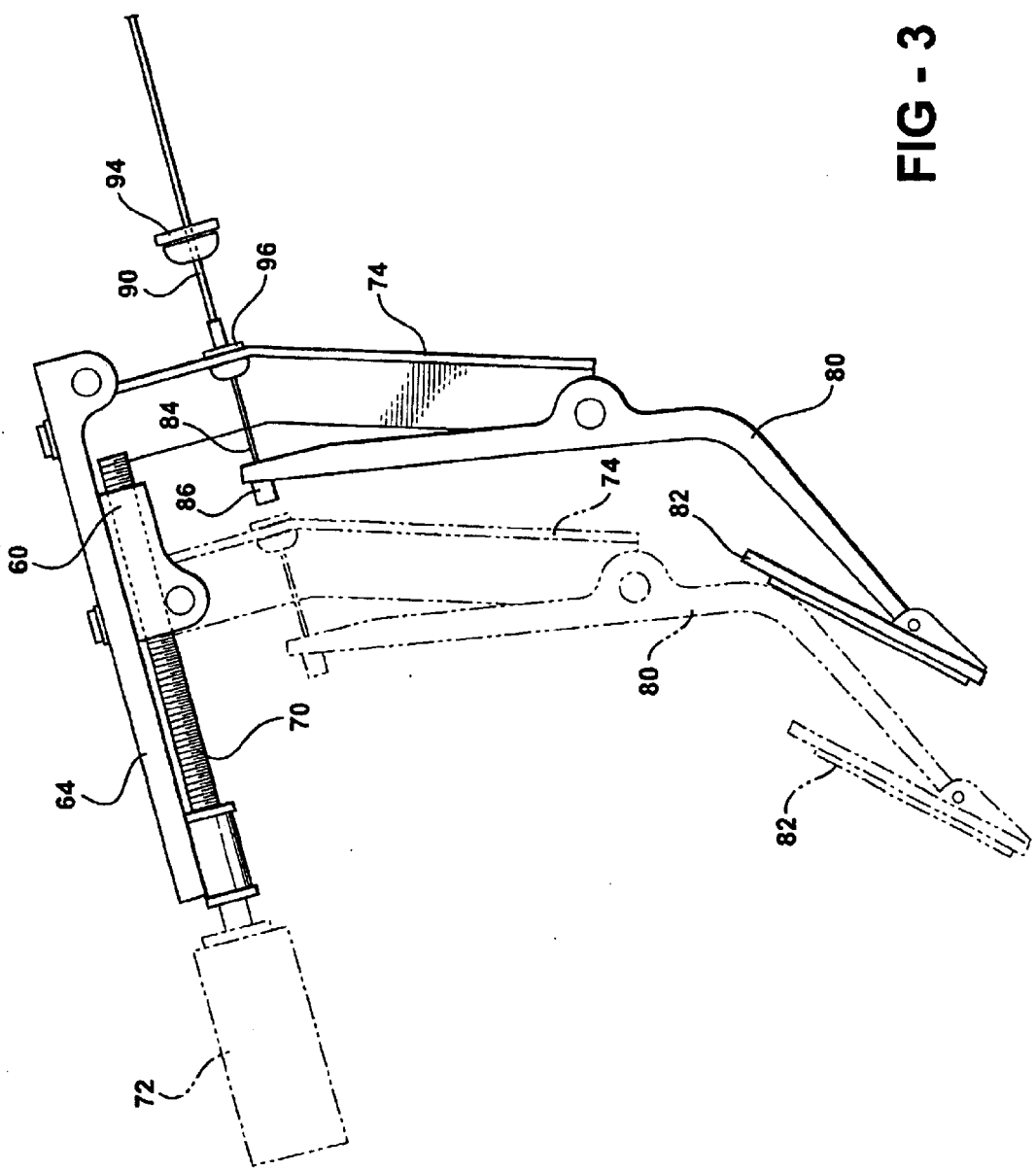
FIG. 3 is a side elevational view similar to that of FIG. 2 illustrating the accelerator arm and accelerator pedal of the actuator of the present invention shown in FIGS. 1 and 2 with the linkages to the brake pedal or clutch pedal being removed for clarity of illustration.

The actuator 7 also has a slider 60. The slider 60 is pivotally connected with pedal link 54 and the upper rear link 48 along a sixth pivotal connection 56. The slider 60 is translationally mounted on a frame 64. The frame 64 is fixably connected with the vehicle and is inclined from an upper front end 66 to a lower rearward end 65. The slider 60 is connected with a nut 68. The nut 68 encircles a power screw 70. The power screw 70 is rotated by an electric motor 72. The frame 64 has a first pivotal connection 20 with the rod link 18 and the upper front link 28. As best shown in FIGS. 1 and 3, the slider 60 is fixably connected with an accelerator arm 74. Adjusted movement of the slider 60 also causes adjusted movement of the accelerator arm 74. The accelerator arm 74 pivotally connects an accelerator pedal link 80. The accelerator pedal link 80 has pivotally attached thereto a pedal pad 82. The pedal link 80 is connected with an accelerator cable tension member 84. The tension member 84 at its extreme end is clamped by a stop 86. The tension member 84 is encircled by a sleeve 90. The sleeve 90 slides through a grommet 94. The grommet 94 is fixably connected on the upper portion of the vehicle floor or fire wall which separates the interior of the vehicle from the exterior. The sleeve 90 has a grommet end 96 which is fixably connected on the accelerator arm 74. The distance between the end of the sleeve at grommet end 96 and the tension member stop 86 remains constant regardless of the position of the accelerator arm 74. Movement of the accelerator arm 74 along with the slider 60 causes the sleeve 90 to slide through the grommet 94.

Figure 4:
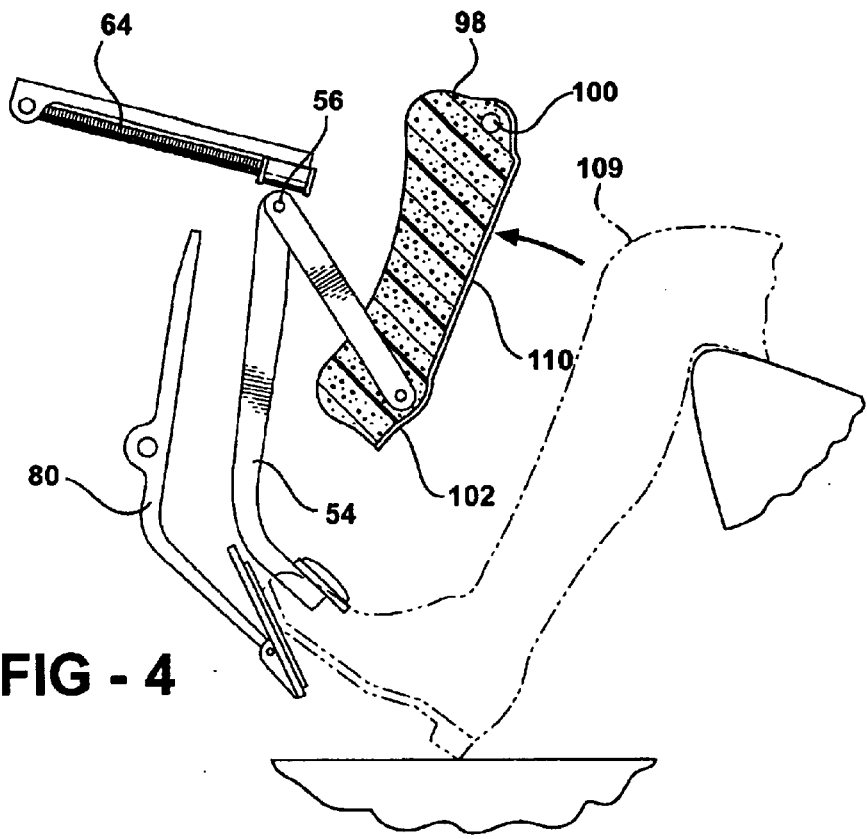
FIGS. 4–5 illustrate portions of the actuator of FIGS. 1–3 in an opposite view and with most of the linkages to the clutch or brake pedal and the actuator pedal being removed for clarity of illustration to demonstrate a knee bolster of the present invention in various adjusted positions.
Figure 5:
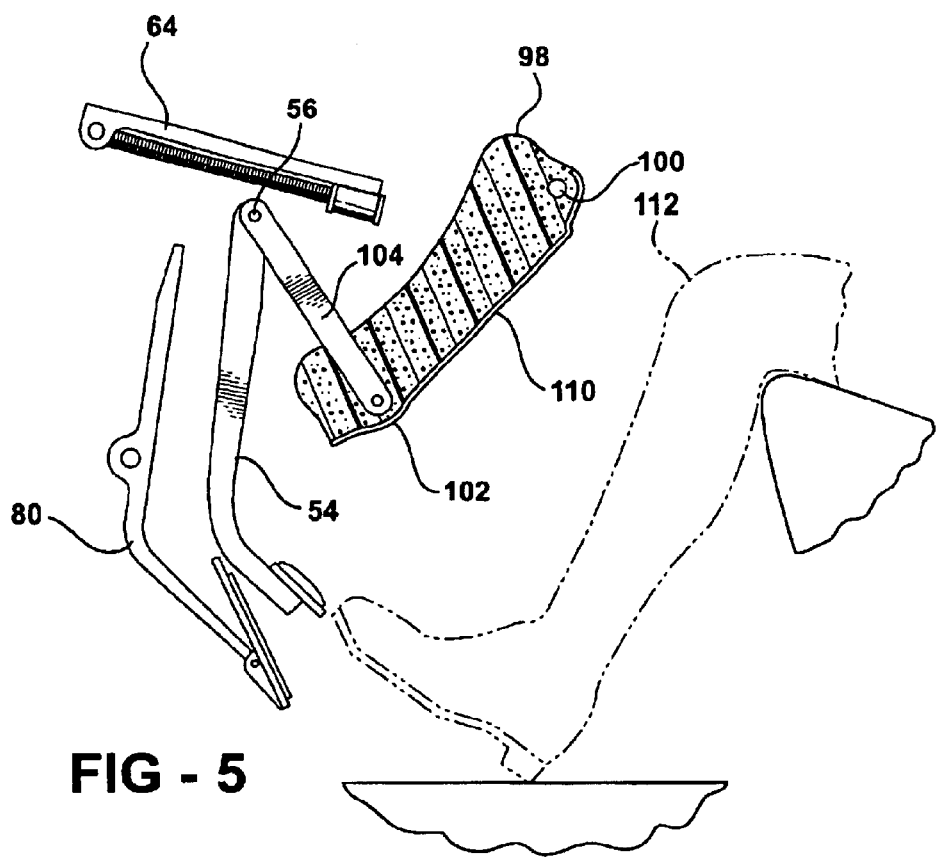

Referring additionally to FIGS. 4 and 5, the actuator 7 additionally has a knee bolster 98. The knee bolster 98 is pivotally connected along pivot axis 100 to an area adjacent to or of the dashboard of the vehicle (not shown). The knee bolster 98 at a lower end 102 is pivotally connected with a bolster link 104. The bolster link 104 is pivotally connected with respect to the slider along the sixth pivotal connection 56. Adjustment of the slider also causes adjustment of the knee bolster 98. The bolster link 104 is collapsible to absorb energy in a vehicle crash situation.

The links of the actuator 7 form two parallelograms. The first parallelogram is between the rod link 18, the lower front link 32, the upper front link 28 and the middle link 36. The second parallelogram is comprised of the middle link 36, the upper rear link 48, the pedal link 54 between the sixth pivotal connection 56 and the seventh pivotal connection 58 and the lower rear link 50. Since the middle link 36 is part of both parallelograms, the force placed on the pedal link 54 will be multiplied at a constant ratio to provide the force transmitted to the rod 14 regardless of the adjusted position of the slider 60. Adjustment of the slider 60 will cause the pedal link to linearly move fore and aft along line 108. As mentioned previously, the motor 72 will cause the slider 60 to slide upon the frame 64 to adjust the position of the pedal links 54. Additionally, since the accelerator arm 74 is fixably connected with the slider 60, movement of the slider 60 also adjusts the position of the accelerator pedal.

In a manner well known to those familiar with the art of linkages, certain links in the actuator may actually be double links which have a pivotally connecting link juxtaposed between them. An example is shown in FIG. 1 wherein there are actually two lower rear links parallel-spaced from one another that are pivotally connected to the pedal link 54. In like manner, there is provided two upper rear links 48.

Referring again to FIGS. 4 and 5, it is apparent that adjustment of the actuator 7 from the position shown in FIG. 5 to the position shown in FIG. 4 causes the knee bolster 98 to assume a more upright or vertical position. Typically, the adjusted position in FIG. 4 will be that for a smaller occupant. Accordingly, the distance between the smaller occupant's knee 109 and an assumed impact area 110 is held to as little an area as possible. Referring to FIG. 5, wherein the actuator has been adjusted forward, the impact area 110 is accordingly moved forward to try to maintain as much as possible a constant distance from the large occupant's knee 112 to the impact area 110.

While the invention has been described in connection with a preferred embodiment, it will be understood that it is not intended to limit the invention to this particular embodiment. On the contrary it is endeavored to cover all alternatives, modifications and equivalent as may be included within the spirit and scope of the invention as encompassed by the description and as defined by the appended claims.

We claim:

1. A locationally adjustable actuator for providing a force input to a rod operatively associated with an automotive vehicle control, said actuator comprising:
    a rod link with a first pivotal connection with respect to said vehicle and a second pivotal connection with respect to said rod;
    an upper front link having a pivotal connection with respect to said vehicle generally adjacent said rod link's pivotal connection with respect to said vehicle;
    a lower front link having a pivotal connection with respect to said rod link;
    a middle link having a pivotal connection with respect to said upper front link, said middle link also having a pivotal connection with respect to said lower front link;
    an upper rear link having a pivotal connection with respect to said middle link generally adjacent said pivotal connection of said upper front link with respect to said middle link;
    a lower rear link having a pivotal connection with respect to said middle link generally adjacent said pivotal connection of said lower front link with respect to said middle link;
    a pedal link having pivotal connections with respect to said upper rear link and said lower rear link; and
    a slider powered by a rotating screw and said slider is fixably connected with a nut encircling said screw, said slider having a pivotal connection with respect to said pedal link, said slider being linearly adjustable with respect to said vehicle to linearly adjust the position of said pedal link.

2. An actuator as described in claim 1 wherein said slider is slidably mounted on a track, said track being fixably connected with said vehicle.

3. An actuator as described in claim 2 wherein said rod link is pivotally connected with said track.

4. An actuator as described in claim 1 for controlling a braking system of an automotive vehicle.

5. An actuator as described in claim 1 for controlling a clutch of an automotive vehicle.

6. An actuator as described in claim 1 wherein said rod link and said upper and lower front and rear links and said middle link and said pedal link form two parallelograms.

7. An actuator as described in claim 1 having a generally constant push rod to pedal force ratio.

8. An actuator as described in claim 1 wherein said slider is adjusted between a vertical upper position and a lower rear position.

9. A locationally adjustable actuator for providing a force input to a rod operatively associated with an automotive vehicle control, said actuator comprising:

a rod link with a first pivotal connection with respect to said vehicle and a second pivotal connection with respect to said rod;

an upper front link having a pivotal connection with respect to said vehicle generally adjacent said rod link's pivotal connection with respect to said vehicle;

a lower front link having a pivotal connection with respect to said rod link;

a middle link having a pivotal connection with respect to said upper front link said middle link also having a pivotal connection with respect to said lower front link;

an upper rear link having a pivotal connection with respect to said middle link generally adjacent said pivotal connection of said upper front link with respect to said middle link;

a lower rear link having a pivotal connection with respect to said middle link generally adjacent said pivotal connection of said lower front link with respect to said middle link;

a pedal link having pivotal connections with respect to said upper rear link and said lower rear link; and a slider having pivotal connection with respect to said pedal link, said slider being linearly adjustable with respect to said vehicle to linearly adjust the position of said pedal link, wherein said slider includes an accelerator arm, said accelerator arm pivotally connects an accelerator pedal link and wherein an accelerator pedal link is connected with a tension member having an extreme end.

10. An actuator as described in claim 9 wherein said tension member has a sleeve fixably connected with said arm and said distance between said sleeve and said tension member extreme end remains constant regardless of the position of said slider.

11. A locationally adjustable actuator for providing a force input to a rod operatively associated with an automotive vehicle control, said actuator comprising:

a rod link with a first pivotal connection with respect to said vehicle and a second pivotal connection with respect to said rod;

and upper front link having a pivotal connection with respect to said vehicle generally adjacent said rod link's pivotal connection with respect to said vehicle;

a lower front link having a pivotal connection with respect to said rod link;

a middle link having a pivotal connection with respect to said upper front link, said middle link also having a pivotal connection with respect to said lower front link;

an upper rear link having a pivotal connection with respect to said middle link generally adjacent said pivotal connection of said upper front link with respect to said middle link;

a lower rear link having a pivotal connection with respect to said middle link generally adjacent said pivotal connection of said lower front link with respect to said middle link;

a pedal link having pivotal connections with respect to said upper rear link and said lower rear link;

a slider having pivotal connection with respect to said pedal link, said slider being linearly adjustable with respect to said vehicle to linearly adjust the position of said pedal link; and having a knee bolster pivotally connected to an area adjacent a dashboard of said vehicle and said knee bolster having a bolster link pivotally connected with respect to said slider and moved with adjustment of said slider.

12. An actuator as described in claim 11 wherein an adjustment of said slider rearwardly causes said knee bolster to be moved to a more vertical orientation.

13. An actuator as described in claim wherein said bolster link is collapsible.

14. A locationally adjustable actuator for providing a force input to a rod operatively associated with an automotive vehicle control, the actuator comprising:

a rod link with a first pivotal connection with said vehicle and a second pivotal connection with said rod;

an upper front link with a first pivotal connection with said vehicle with said rod first pivotal connection;

a lower front link with a third pivotal connection with said rod link;

a middle link having a first end with a fourth pivotal connection with said upper front link, and said middle link having a fifth pivotal connection with said lower front link;

an upper rear link having a fourth pivotal connection with said upper front link and said middle link;

a lower rear link having a fifth pivotal connection with said lower front link and said middle link;

a pedal link having a sixth pivotal connection with said upper rear link and a seventh pivotal connection with said lower rear link;

a slider having a sixth pivotal connection with said pedal link and said upper rear link wherein linear adjustment with said slider with respect to said vehicle linearly adjusts the position of said pedal link with respect to said vehicle; and a knee bolster pivotally connected to an area adjacent a dashboard of said vehicle and said knee bolster having a pivotally connected bolster link pivotally connected to said slider and moving with adjustment of said slider.

15. An actuator as described in claim 14 wherein said slider is inclined to a vertical upper position to a lower rear position.

16. An actuator as described in claim 14 wherein said slider is mounted on a frame and said frame provides said first and sixth pivotal connections.

* * * * *